United States Patent Office 3,272,758
Patented Sept. 13, 1966

3,272,758
EMULSION FORMING COMPOSITION AND METHOD OF MAKING AND UTILIZING SAME
Earl R. De Lew, Corte Madera, and Arthur Lazar, Palo Alto, Calif., assignors to Yosemite Chemical Co., San Francisco, Calif., a corporation of California
No Drawing. Filed July 18, 1962, Ser. No. 210,817
8 Claims. (Cl. 252—354)

This invention relates to an emulsion forming composition, and more particularly to a composition of such type capable of rapidly forming a relatively stiff water-in-oil emulsion in the form of a gel in the presence of water, and to a method of making and utilizing the same.

Although the composition has varied applications wherever it is desired to produce a water-in-oil emulsion rapidly in the presence of water, it has particular application in forming a stiff gel with oil slicks and spills, including lighter fractions of oil such as gasoline, on the surface of still or moving bodies of water, to enable such slicks and spills to be readily removed mechanically from the surface of the water after the gel has been formed, and thus prevent injury to marine life.

Reference is made to assignee's copending application, Serial No. 139,362, filed September 20, 1961, for "Method of Treating Oil on the Surface of Water," by Earl R. De Lew, one of the co-applicants hereof. One of the substances disclosed therein for forming such emulsion is a solution of a metal soap of the fatty acids contained in wool grease formed by reaction of the metal compound with degras (crude lanolin). This soap is dissolved in a hydrocarbon diluent and acts as a congealing agent in forming the gel which can be readily mechanically removed from the surface of the water to thus avoid contamination of bodies of water which would be injurious to marine animal as well as marine plant life upon which fish may feed.

The composition hereof is a special improved type which is particularly effective in bringing about gelation or congealing of oil in contact with water within a very short time of exposure, and which is markedly effective in producing a stiff gel that can be readily mechanically removed by instrumentalities of the type disclosed in said aforementioned application, such as screens or clam shell buckets. It is of sprayable consistency so that it can be pumped and sprayed from a suitable conventional spray nozzle at a sufficient pressure to cause the sprayed liquid to penetrate through the oil slick and come in contact with the underlying water so as to form a stiff water-in-oil gel whereby the oil is rapidly congealed.

Summarizing the invention, it has been found that soaps of fatty acids originally present in but separated from wool grease, also designated as degras or crude lanolin, are particularly effective for the described purpose when dissolved in a hydrocarbon diluent or carrier in such a manner that a non-hydrous, homogeneous, storable liquid is obtained of the aforementioned sprayable consistency. Separation of these fatty acids from wool grease is by conventional methods, such as solvent extraction or ester distillation, as is described in an article by A. W. Weitkamp, Journal of American Chemical Society, 67, 447 (1945).

To enhance rapid formation of the gel, the composition advantageously contains any suitable surface active agent which will increase the affinity of the essentially hydrophobic metal soap solution in the diluent, to water, and thereby cause a small proportion of the water to penetrate the liquid soap solution when it is sprayed on to the oil slick, and thereby accelerate gelling of the oil. In addition, it is advantageous that the composition contain a relatively slight excess of such free fatty acids as the presence of the excess is particularly effective in gelling of relatively heavy fuel oil. However, if the oil slick is a light product, such as gasoline, it is not important to have excess acid, but since it is not known beforehand what type of oil the composition may be required to gel, it is desirable to have the excess acid therein for all types of oil spill.

The method of preparing the composition is such that all water is driven off therefrom by application of heat so as to render it substantially entirely non-hydrous, or in other words, substantially free from water, because if the composition were to contain more than trace amounts of water, this would result in premature gelling during storage which would render the composition commercially impractical. Also, in the method, all unreacted metal compounds employed in forming the fatty acid soaps are removed, because their presence would result in slow reaction with excess free fatty acids causing formation of water which would result in premature gelling of the composition during storage.

The fatty acid soap and excess free fatty acids are non-toxic to marine life; and when the composition is employed for removing oil slicks from water in the manner described in the aforementioned application, the surface active agent and hydrocarbon thinner should be such as not to render the composition toxic to marine life. However, when employed for other purposes where toxicity is not a problem, the surface active agent and diluent need not be non-toxic.

From the preceding, it is seen that the invention has as its objects, among others, the provision of an improved sprayable liquid composition for rapidly forming a relatively stiff water-in-oil gel with oil in the presence of water and which is non-toxic to marine life, and which is simple and economical; and to an improved method of making such composition non-hydrous, and consequently storable so that it will have a relatively long shelf life. Other objects of the invention will become apparent from the following more detailed description.

With reference to the free wool grease fatty acids, they are quite unlike those found in other fat substances of animal or vegetable origin. As is described in the aforementioned Journal of American Chemical Society article, representatives of four different homologous series of free fatty acids have been identified in wool grease as follows:

A. Normal fatty acids of the type commonly present in animal and vegetable fats, varying in chain length from $C_{10}$ up to $C_{26}$ (about 9.5% by weight of total free acids).

B. Optically active 2-hydroxyacids in the range of $C_{14}$ to $C_{16}$ (about 4.2% of total free acids).

C. Iso-acids with the side chain in penultimate position, ranging from $C_{11}$ to $C_{26}$ (about 39.3% of total free acids).

D. Iso-acids with the side chain in anti-penultimate position (that is, located at the third carbon of the chain), ranging from $C_9$ to $C_{31}$ (about 47% of total free acids).

In other words, about 90% of the fatty acids in wool grease have molecular structures different from those found in other fats and oils. This may very well account for the unique characteristics of their metal soaps within the context of this invention.

The metal compounds most effectively employed for making the soap with the wool grease fatty acids, are divalent metal oxides and hydroxides, or metal salts of volatile organic acids such as acetates or formates. Examples of these are calcium, barium, strontium and magnesium compounds. Of these, the alkaline earth metals, namely, calcium, barium, and strontium are particularly effective. The calcium compounds have been found most advantageous for reaction with the free wool grease fatty acids. As is explained later, the metal soap is incorporated in the liquid hydrocarbon carrier in such a manner that an anhydrous homogeneous liquid is obtained.

As the surface active agent or surfactant for increasing the affinity of the essentially hydrophobic soap solution to water, a wide choice is available. However, since a homogeneous system is important, the surface active agent should be compatible with the metal soap solution and, on the other hand, has to be at least partially soluble in water to perform its desired function of incorporating desirable water into the composition for rapid gel formation. The surface active agent may be anionic or non-ionic, but is desirably of the anionic type because they are somewhat less critical in the amounts thereof that can be employed without gel inhibition or complete emulsification of the composition.

Examples of non-ionic surfactants are alkyl phenyl polyethylene glycol ethers (Tergitol NPX by Carbide and Carbon Company); polyethylene polyoxypropylene glycol (Pluronic L64 by Wyandotte Chemical Company); rosin acid esters of polyoxyethylene glycol (Ethofat 242/25 by Armour Industrial Chemical Co.); N-alkyl trimethylene diamine dioleate (Duomeen A Dioleate by Armour); and alkyl phenyl polyethyoxyethanol (NIO by Oronite Chemical Company).

Examples of anionic surfactants are alkali metal soaps of tall oil fatty acids, alkali metal rosin soaps, naphthenic acid alkali metal soaps, and petroleum sulfonates. The most advantageous and effective surfactants and which are consequently desirably employed in the composition particularly since they do not impart marine life toxicity to the composition, are the anionic sodium sulfonate types, particularly sodium petroleum sulfonate which comprise sodium soaps of sulfonic acids originating from sulfonation of petroleum lube oil fractions, such as "Petronate" (Sonneborn and Sons); "Synfonate" (Bray Oil Company); and "Sulfonates 425" (Shell Oil Company).

As previously related, it is important that the liquid hydrocarbon diluent which constitutes the major constituent of the composition also be non-toxic when the composition is employed for gelling oil slicks on bodies of water. In this connection, the evaluation of petroleum products with respect to toxic effect on marine life, is based on test procedures prescribed by the Fish and Game Commission of the State of California, as given in the "Standard Methods for the Examination of Water Sewage and Industrial Wastes," 11th edition, American Public Health Association, 1960. Based on such tests, the various groups of hydrocarbons were rated as follows as to toxicity:

| | Toxicity |
|---|---|
| Aromatics | High |
| Naphthenes, olefins | Medium |
| Paraffines | Low |

It was also found that for each group the low boiling and low viscosity representatives are more toxic than the higher boiling ranges and viscosities, which is probably due to higher rates of penetration of the former into the life cell structure. By the same token, highly refined oils of lubricating oil range, known as mineral grade white oils, are rated as non-toxic.

The most suitable non-toxic diluent for the principal purpose of the invention are iso-paraffinic fractions derived from special synthetic petroleum fractions, originating from alkylation processes, which are available over a wide range of volatility. Those particularly suitable are known as so-called "odorless thinners." Average properties of such "odorless thinners" are as follows:

| | |
|---|---|
| Specific gravity | 0.7599 |
| Flash point, ° F. | 136 |
| Boiling range, ° F. | 350 to 390 |
| Character of composition, essentially iso-paraffinic, percent | 100 |

However, if non-toxicity is not important in the environment where the composition is employed to form the water-in-oil emulsion in the presence of water, any suitable petroleum oil diluent, such as diesel or stove oil can be employed.

With respect to proportions of ingredients in the composition, they may vary relatively widely with resultant varying gel times and gel consistencies when the composition is employed. However, it is advantageous in order to provide a relatively low viscosity enabling ready spraying of the composition at ambient temperatures, that the hydrocarbon diluent constitute the major amount of the composition, that the wool grease fatty acid soap and the surface active agent be in a minor amount with the surface active agent in lesser quantity than the soap. Excess free fatty acid should also be in a minor amount compared to the quantity of soap in the composition so as not to render the composition unduly viscous.

A desirable proportional range of the soap and hydrocarbon diluent based on the total amount of soap and diluent is about 20 to 45% by weight soap, and 80 to 55% by weight of diluent. A desirable range by weight of the surface active agent based on the weight of the soap is about 0.3% to 3% in the case of non-ionic agents as this range is relatively critical. If added substantially above such range, gel formation may be completely inhibited. With respect to anionic surfactants, they are not so critical and may vary from about 3% to 50% by weight of the amount of the soap; and the desirable sodium sulfonate type surfactant about 20% to 50% by weight of the soap. The amount of excess free fatty acid can be best predicated on the total amount of the composition and should not exceed about 8% by weight of the total weight of the composition; otherwise the composition may be too viscous for spraying.

The following is an example of an advantageous embodiment of the composition in both parts, and approximate percent by weight based upon the total weight of the composition.

*Example I*

Soap consisting of the reaction product of:

| | Percent by weight |
|---|---|
| Fatty acids originally present in but separated from wool grease | 24.0 |
| Calcium hydroxide | 2.0 |
| Sodium petroleum sulfonate surfactant (preferably, the aforementioned "Synfonate") | 8.0 |
| Petroleum oil diluent (odorless thinner type having properties previously described) | 66.0 |
| | 100.0 |

A desirable viscosity range is about 130 to 300 Saybolt Universal at 100° F., and preferably about 150 to 200 at 100° F. Although the quantities of diluent with respect to soap may vary widely as indicated by the range noted, too little of the diluent results in a composition which may have too high a viscosity, while too great a quantity of diluent may slow up gelling time of the oil to be gelled. Concerning excess free fatty acid, it need not be present but as previously related, if absent, the composition will take a longer time to gel heavy fuel oil; and too much excess fatty acid increases viscosity and pour point. Therefore, for best results, a minor amount of excess free fatty acid should be present in the composition.

In making the composition, the wool grease free fatty acids are reacted with the metal compound by application of heat and in the presence of some of the diluent, as this enhances both the reaction and solution of the soap in the diluent. Lime in the form of either calcium hydroxide or oxide is preferred; and the amount of free fatty acids is at least substantially stoichiometrically equivalent to the lime. In other words, there is always enough free fatty acid to react with the lime but an excess of fatty acid is desirable for the reasons stated previously.

The fatty acids originally present but separated from wool grease are first melted by placing the same in a heated container which can be of the open pot type, and heated in any suitable manner such as by gas or electricity; and the surface active agent is also preferably placed in the heated container in the presence of the free fatty acids. After melting, desirably at a temperature of approximately 80° C., although this temperature is not critical, a small proportion of the solvent is added, desirably less than the total amount of free fatty acids and surface active agent, and the heating is continued while stirring to incorporate the solvent homogeneously with the molten free fatty acids. The purpose of adding a small proportion of diluent at this point is to aid in dehydrating the composition more thoroughly as the diluent vapors facilitate carrying off the water vapor.

When the lime is added a vigorous reaction commences, and the diluent also serves to subdue frothing besides enhancing the soap formation reaction and solution of soap in the diluent. Then all the lime in a slurry of about 1 part by weight of the calcium hydroxide to about 1 to 2 parts by weight of diluent is gradually added to the mass while stirring is continued. It is desirable that the lime be in slurry form as it reacts much better when in slurry form and is easier to handle, although the proportions of the diluent-lime slurry are not critical.

Next, heating is continued while the temperature is gradually elevated to about 160° to 180° C., and such heating is maintained until as much of the lime as possible reacts with the free fatty acids. After this, the remainder of the solvent diluent is added while stirring, and then the heating is discontinued. It is desirable to allow the composition to cool as rapidly as possible by discontinuing the heating so as to prevent loss of solvent.

It is difficult to obtain complete reaction of all the lime with the free fatty acids within a commercially practical time period even though there is an excess of free fatty acids present. Such complete reaction could be obtained by continuing the heating over a protracted period of time, for several days, but then the process would not be commercially economical. Presence of free lime resulting from such incomplete reaction, is detrimental during storage of the composition because it shortens the shelf life as it gradually reacts with excess free fatty acid, with resultant formation of water causing premature gelation of the composition.

Therefore, to provide for long storage time and shelf life, substantially all unreacted lime is removed from the composition. This can be readily done by any suitable method such as filtration, or centrifuging by conventional centrifuging apparatus. Centrifuging is preferred because filtration is too slow.

Although in the described procedure, the free fatty acids are preferably melted in the presence of the surface active agent, this is not critical. If desired, the surface active agent can be added at any other point in the procedure as long as there is sufficient heat and time to drive off water contained therein.

The following is an example of an advantageous embodiment of the process for making the advantageous composition of Example I; the proportions being in parts and percent by weight of the total weight of the composition.

*Example II*

24 parts by weight of wool grease free fatty acids and 8 parts by weight of sodium petroleum sulfonate ("Synfonate") surfactant are placed in an open vessel heated by external means, such as gas, and maintained at a temperature of approximately 80° C., for about an hour and one-half until the free fatty acids have melted. This temperature and time are not critical; it being necessary only to heat at a temperature and for a time sufficient to melt the free fatty acids. A desirable commercial type of wool grease free fatty acids is that obtainable from N. I. Malmstrom & Company, Brooklyn, New York, known as wool grease fatty acids with the following specifications:

Free fatty acid as oleic, percent minimum _____ 50
Saponification No. _____ 120–150
Ratio of free fatty acid content to saponification
  No., minimum _____ 0.4
Ash, maximum _____ 0.1
Water, maximum _____ 5.0

Next, 7 parts by weight of the foregoing type of "odorless thinner" diluent are added, and the heating is continued to bring the mixture up to about 90 to 100° C. which is the temperature at which the lime commences to react. The higher the temperature, the faster will be the reaction of the lime with the free fatty acids, but it is desirable not to exceed 100° C. before the lime is added because when the lime is added, it may react too fast, causing extreme frothing.

When the temperature has been thus raised, a slurry of about 2 parts by weight of calcium hydroxide in about 3 parts by weight of the "odorless thinner" solvent is slowly added to the mixture in the heated container while stirring. The temperature gradually rises as a result of exothermic reaction and further external heating. The water formed from the neutralization of the free fatty acids comes off in the form of steam accompanied by vigorous "boiling" of the mix.

The heating is continued until as much of the lime present has reacted as is commercially practical. This heating may be up to a final elevated temperature of about 170° C. for about one and one-half to two hours although the temperature is not critical. It is, however, important that the heating be continued to the point where substantially all water is removed which can be readily ascertained because of absence of frothing resulting from evolution of steam.

After this, the application of heat is terminated and the remainder of solvent, about 56 parts by weight, is added to the mix. If material amounts of solvent are lost by evaporation during the reaction or during the cooling of the composition down to ambient temperature, sufficient solvent is finally added to make up the loss, and bring the amount of solvent to about 66 parts or percent by weight of the entire composition. Substantially all traces of unreacted lime are finally removed by centrifuging for the reason previously related.

In the foregoing example, the parts total up to about 100, thus being also in percent by weight of the total composition. Actually in the example, each part represents a pound and the times prescribed are those for a total batch of 100 pounds. With larger or smaller amounts of material in batches, the times will of course vary.

The resultant solution will have approximately 34% by weight of total solids consisting of the soap, free fatty acids and surface active agent in which about 1.5 to 3% by weight of the total composition will be free unreacted wool grease fatty acids; and its viscosity will be about 120 to 150 Saybolt Universal at 100° F. The composition is liquid, non-hydrous, and can be sprayed by an ordinary type of nozzle. It is stable in storage and will have a shelf life of many months without premature gelling before use. To prevent water from entering the composition during storage and thereby cause premature gelation, it is packaged in sealed metal drums or other suitable containers.

In gelling oil slicks on water, the advantageous embodiment of Example I made by the desirable method of Example II is sprayed onto the oil spill which may be light oil fractions, such as gasoline, as well as heavy oil, such as fuel oil. A stiff gel forms rapidly as a result of agitation of the oil slick by the spraying, and the continual agitation caused by the wave motion of the water.

Usually, about one-half the amount by weight of the composition based on the total amount of oil spill, applied over the entire area of the spill and along the edge or perimeter thereof will suffice to effect the desired formation of the stiff gel. However, excess amounts do not do any harm but merely add to the cost of the material. Any portion of the spill to which the composition is sprayed will emulsify to a stiff gel that can be physically removed in about 5 to 15 minutes after application of the composition. The composition need not be heated when it is sprayed onto the spill and can be applied from a tank carried by boat travelling as many times through the spill as is necessary to cover the same.

The described hydrocarbon diluent has flash points well above gasoline. Thus, when the composition is employed for slicks of such character, fire hazard is materially reduced. However, in order to accomplish complete fire protection in the case of gasoline spills, a suitable halogenated hydrocarbon diluent can be substituted as a part of the diluent. Fluorinated and fluorinated-chlorinated hydrocarbons are non-toxic to marine life as well as non-flammable and are preferred for oil spill removal. About 40% to 60% by weight of the diluent may be composed of said halogenated hydrocarbon which can be added at the end of the foregoing described method of making the composition. Such amount provides a protective blanket of non-flammable vapor which is advantageous in the case of gasoline spills.

We claim:

1. A sprayable liquid composition for producing a rapid forming water-in-oil gel in the presence of water, consisting essentially of a divalent metal soap of fatty acids originally present in but separated from wool grease, a surface active agent selected from the group consisting of anionic and non-ionic surface active agents which increase the affinity of said soap to water, and a liquid petroleum hydrocarbon diluent in which said soap and surface active agent are soluble; the percent by weight of said soap and said diluent in said composition based on the total amount of said soap and said diluent being about as follows:

| | Percent by weight |
|---|---|
| Soap | 20 to 45 |
| Diluent | 80 to 55 | and the amount by weight of said surface active agent varying from about 0.3 to 50% of the weight of said soap.

2. The composition of claim 1 having present therein an excess of said free fatty acids separated from wool grease in an amount up to about 8% based on the total weight of said composition.

3. A sprayable liquid composition for producing a rapid forming water-in-oil gel in the presence of water, consisting essentially of a divalent metal soap of fatty acids originally present in but separated from wool grease, a sodium petroleum sulfonate surface active agent which increases the affinity of said soap to water, and a liquid petroleum hydrocarbon diluent non-toxic to marine life in which said soap and surface active agent are soluble; the percent by weight of said soap and said diluent in said composition based on the total amount of said soap and said diluent being about as follows:

| | Percent by weight |
|---|---|
| Soap | 20 to 45 |
| Diluent | 80 to 55 | and the amount by weight of said sodium sulfonate surface active agent varying from about 20 to 50% of the weight of said soap.

4. The composition of claim 3 having present therein an excess of said free fatty acids separated from wool grease in an amount up to about 8% based on the total weight of said composition.

5. The method of forming a relatively stiff water-in-oil gel on a body of water to enable subsequent mechanical removal thereof which comprises spraying onto oil on the water a sprayable liquid composition for producing a rapid forming water-in-oil gel in the presence of water, consisting essentially of a divalent metal soap of fatty acids originally present in but separated from wool grease, a surface active agent selected from the group consisting of anionic and non-ionic surface active agents which increase the affinity of said soap to water, and a liquid petroleum hydrocarbon diluent in which said soap and surface active agent are soluble; the percent by weight of said soap and said diluent in said composition based on the total amount of said soap and said diluent being about as follows:

| | Percent by weight |
|---|---|
| Soap | 20 to 45 |
| Diluent | 80 to 55 | and the amount by weight of said surface active agent varying from about 0.3 to 50% of the weight of said soap.

6. The method of making a sprayable nonhydrous liquid composition for producing a rapid forming water-in-oil gel in the presence of water and which consists essentially of a calcium soap of fatty acids originally present in but separated from wool grease, a surface active agent selected from the group consisting of anionic and non-ionic surface active agents which increase the affinity of said soap to water, and a liquid petroleum hydrocarbon diluent in which said soap and surface active agent are soluble, which comprises heating to molten state said free fatty acids originally present in but separated from wool grease, while such acids are in heated molten condition adding thereto a liquid mixture consisting essentially of lime and some of the liquid petroleum hydrocarbon diluent, the amount of said free fatty acids being at least stoichiometrically equivalent to the lime, continuing the application of heat to a temperature of about 160 to 180° C., to form a soap by reaction between said lime and said separated wool grease free fatty acids and to drive off substantially all water, after such reaction adding more of said liquid petroleum hydrocarbon diluent to provide an amount of diluent constituting about 55 to 80% by weight of the total weight of diluent and resultant soap, and mixing said surface active agent into the composition in an amount varying from about 0.3 to 50% of the weight of the soap.

7. The process of claim 6 wherein the amount of said free fatty acids originally present in but separated from wool grease is in excess of that stoichiometrically equivalent to the lime to provide an amount not exceeding about 8% by weight of the final composition.

8. The process of claim 6 wherein substantially all unreacted lime is removed from the composition.

References Cited by the Examiner

UNITED STATES PATENTS

| 2,330,508 | 9/1943 | McColl | 210—242 |
| 2,762,775 | 9/1956 | Foehr | 252—59 X |
| 2,915,467 | 12/1959 | McCormick | 252—39 |
| 3,033,787 | 5/1962 | Morway et al. | 252—39 |
| 3,046,233 | 7/1962 | Levy | 210—42 X |

LEON D. ROSDOL, *Primary Examiner.*

JULIUS GREENWALD, *Examiner.*

J. T. FEDIGAN, *Assistant Examiner.*